Dec. 10, 1968   A. SWANSON   3,415,080

FLEXIBLE COUPLING

Filed Nov. 23, 1966

INVENTOR.
ARTHUR SWANSON
BY
Browne, Schuyler & Beveridge
ATTORNEYS

United States Patent Office 3,415,080
Patented Dec. 10, 1968

3,415,080
FLEXIBLE COUPLING
Arthur Swanson, Towson, Md., assignor to Poole Foundry & Machine Company, Baltimore, Md., a corporation of Maryland
Filed Nov. 23, 1966, Ser. No. 596,590
10 Claims. (Cl. 64—9)

ABSTRACT OF THE DISCLOSURE

A gear type flexible shaft coupling in which a hub having crowned gear teeth formed thereon is mounted on adjacent ends of a pair of aligned shafts, and a pair of sleeves having internal gear teeth formed therein is mounted, one on the crowned gear teeth of each hub. Torsionally resilient, antifriction connecting means connect the two sleeves to permit limited free axial movement of the sleeves relative to one another and to absorb torsional vibration and impact loads.

---

This invention relates to flexible shaft couplings, and more particularly to an improved flexible gear type shaft coupling which is torsionally resilient and constructed to accommodate substantial relative axial movement between shafts coupled thereby.

Industry has long recognized the advantages of gear type flexible couplings for connecting rotatable shafts wherein perfect alignment of the coupled shafts is difficult to establish or maintain. Such flexible couplings conventionally comprise a hub mounted on the adjacent ends of the driving and driven shafts, with the hubs having an annular row of spherical crowned gear teeth formed around their outer periphery. A sleeve having internal gear teeth is fitted on the two hubs with the gear teeth on the two hubs mating with the internal teeth on the sleeve. Since the hub teeth are spherical, the sleeve is free to float on the two hubs and is therefore self-aligning much in the manner of a ball-and-socket joint. Preferably lubrication seals are provided between the ends of the floating sleeve and the hubs so that a suitable lubricant can be retained in the sleeve to lubricate the gear teeth to thereby minimize wear and to reduce the frictional resistance of the coupling to relative axial movement between the coupled shafts, which relative axial movement is hereinafter referred to as "end float."

While the prior art gear type flexible couplings have been widely used due, primarily, to their ability to accommodate substantial shaft misalignment and to their rugged and reliable construction, they have, nevertheless, not been entirely satisfactory for all installations. For example, under heavy loads, the friction between the gear teeth on the hubs and sleeve offers substantial resistance to axial movement of the shafts even when the gear teeth are properly lubricated, with the consequence that axial loads on one shaft may be transmitted through the coupling to the other shaft. This frequently results in unnecessary and undesirable axial loads being placed on bearings, motors, or the like.

Similarly, in the prior art gear type flexible couplings, the surface-to-surface contact between the gear teeth of the rigid sleeve and the hubs provides a torsionally rigid coupling capable of transmitting vibrations as well as impact or shock loads from one shaft to the other.

While attempts have been made to overcome the above disadvantages of the known gear type flexible coupling, these attempts have not been entirely satisfactory. Accordingly, it is a primary object of this invention to provide an improved gear type flexible shaft coupling which is torsionally resilient and which offers a minimum of resistance to shaft end float.

Another object is to provide such a coupling which permits substantial shaft misalignment and end float, and which is effective in absorbing vibration and torsional impact loads on the coupled shafts.

In the attainment of the foregoing and other objects, an important feature of this invention resides in providing a sleeve assembly made up of two separate sleeve members, each mating with the spherical gear teeth on a hub mounted on the end of one of a pair of opposed, substantially axially aligned shafts. Each of the sleeve members is formed with an outwardly extending flange with a plurality of axially extending openings formed in each of the flanges. An antifriction ball bushing having a resilient mounting ring extending around its outer surface is mounted in each of the openings in one of the flanges, and a headed shaft or bolt extends through each of the bushings and an aligned opening in the flange of the other sleeve member to secure the two sleeve members in axial alignment.

While the two sleeve members are retained in substantial axial alignment by the headed bolts, the ball bushings are free to move axially along the body of the headed bolts to thereby permit the two sleeve members to move axially relative to one another with a minimum of frictional resistance. Simultaneously, the resilient mounting ring on the ball bushing permits limited resiliently resisted torsional movement of the sleeve members relative to one another to minimize the effect vibration or shock loads on the shafts.

Other objects and advantages of the invention will become apparent from the following specification taken with the drawings, in which.

Figure 1:
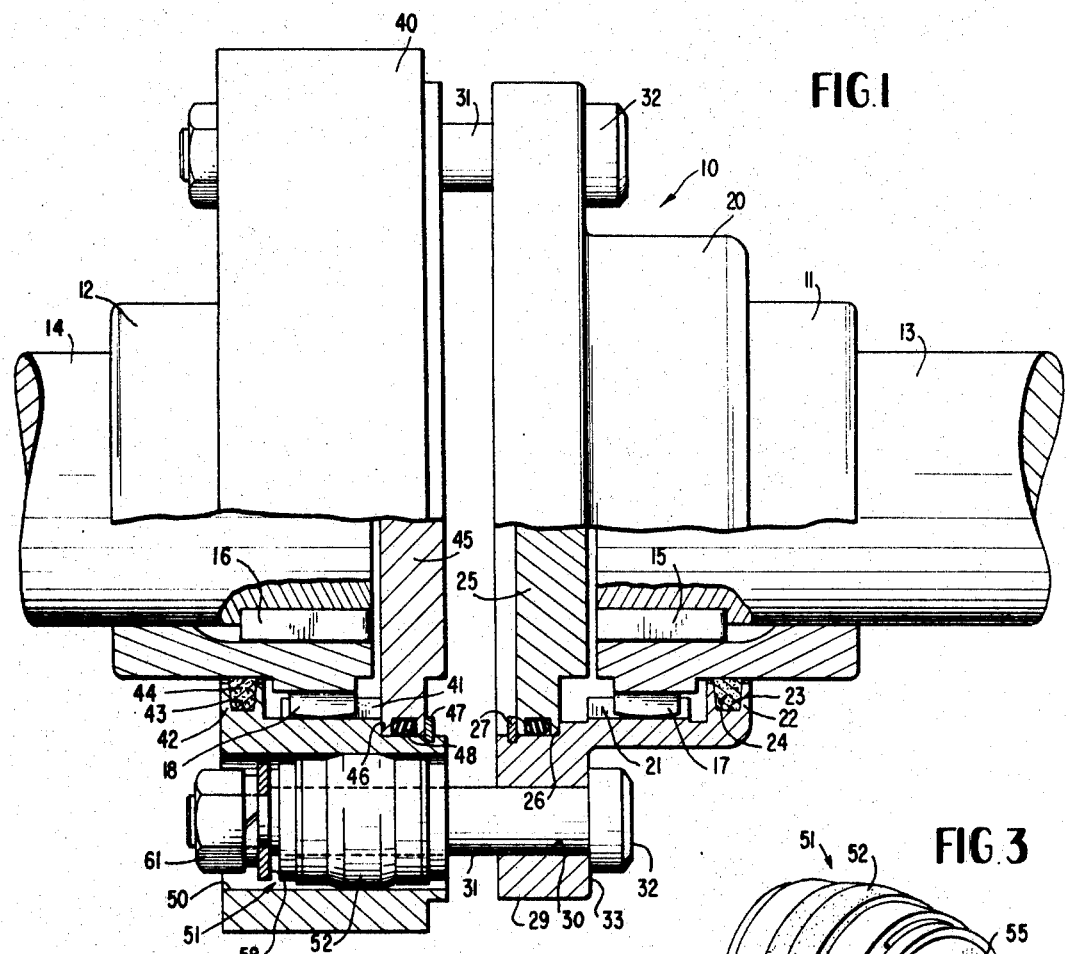
FIGURE 1 is an elevation view, partially in section, of a flexible shaft coupling according to the present invention employed to connect a pair of shafts in end-to-end relation.
Figure 3:
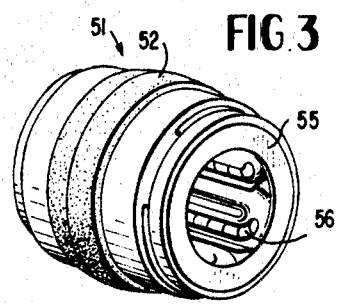
FIGURE 3 is a perspective view of a ball bushing suitable for use in the coupling.
Figure 2:
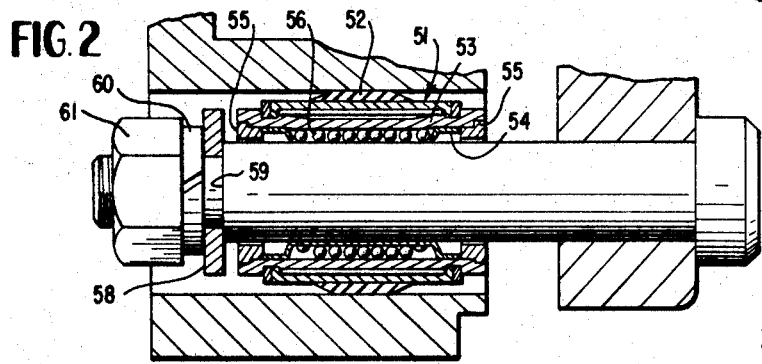
FIGURE 2 is an enlarged view of a portion of the structure shown in FIGURE 1, with the ball bushing being shown in section.

Referring now to the drawings in detail, a flexible shaft coupling according to the present invention is referred to generally by the reference 10 and includes a pair of hub members 11, 12 rotatably fixed on the end of shafts 13, 14, respectively by keys 15, 16, respectively, An annular row of spherical crowned gear teeth 17 is formed on the outer periphery of hub 11, and a similar annular row of spherical crowned gear teeth 18 is formed on the outer periphery of hub 12.

A first annular sleeve 20 having a row of gear teeth 21 formed around its inner periphery is mounted on hub 11, with gear teeth 21 mating with spherical crowned gear teeth 17. An inwardly directed flange 22 is formed on the end of sleeve 20, and an outwardly directed channel 23 is formed on the inner face of flange 22 to receive a resilient lubrication packing or seal 24 which engages the outer cylindrical surface of hub 11 to maintain a lubrication-tight seal therewith while permitting limited radial movement of flange 22 with respect to hub 11. A disk shape plug or plate 25 is received within sleeve 20 at the end thereof opposite flange 22, and is retained within the open end of sleeve 20 by a shoulder 26 formed within the inner pheriphery of sleeve 20 and by a snap ring 27. An O-ring seal 28 forms a fluid-tight lubrication seal between the outer periphery of disk 25 and the inner periphery of sleeve 20.

Sleeve 20 is formed with outwardly extending flange 29 having a plurality of axially extending openings 30 formed therein, and a plurality of headed bolts or shaft members 31 are mounted one in each of the openings 30. Preferably the internal diameter of the openings 30 and the external diameter of the shaft portion of the headed bolts 30 are substantially equal so that the bolts are retained firmly in the openings in axial alignment with the sleeve 20 to permit the bolts to transmit torque through the sleeve and the hub 11 to shaft 13. Heads 32 of bolts 31 engage the radial face 33 of flange 29 to prevent bolts 31 from being drawn through flange 31 in the direction of shaft 14.

A second annular sleeve 40 having a row of gear teeth 41 formed around its inner periphery is mounted on hub 12 with the gear teeth 41 meshing with the spherical crowned gear teeth 18. An inwardly directed flange 42 is formed on one end of sleeve 40, and has an outwardly directed groove 43 formed on its inner periphery for receiving a resilient lubrication seal 44 which engages and forms a lubrication seal with the outer cylindrical surface of hub 12 while permitting limited radial movement between flange 42 and hub 12. A disk-shaped plug 45 is mounted in sleeve 40 at the end thereof opposite flange 42 and is retained therein by a radial shoulder 46 on the inner surface of flange 40 and by a snap ring 47. A resilient O-ring seal 48 forms a lubrication seal between the inner periphery of sleeve 40 and the outer periphery of disk-shape plug 45.

Sleeve 40 has a plurality of axially extending openings 50 formed therein. The openings 50 are of a larger diameter than the openings 30 in sleeve 20, but these openings 30 and 50 are equally spaced both radially and circumferentially. An antifriction ball bushing 51 is mounted in each of the openings 50, and is retained therein by the frictional contact between the inner surface of the opening 50 and a resilient mounting ring 52 extending around the outer surface of the ball bushing.

The ball bushings 51 each comprise an elgonated substantially cylindrical sleeve 53 having a plurality of bearing cages 54 supported on their inner surface as by retainer rings 55. The bearing cages 54 each support an oblong row of ball bushings 56 for movement around a closed path, with the bearings along one straight run of the oblong path extending in a line parallel to the axis of the bushing and being exposed on the inner surface of the bushing to support the busing for axial movement along the cylindrical outer surface of bolt 31. Ball bushings of this general type are conventional, and as such, form no part of the instant invention. Similarly, ball bushings including a resilient mounting ring for supporting the bushing within a cylindrical bore are conventional, one such bushing being manufactured by Thomson Industries, Inc., Manhasset, N.Y.

The cylindrical body of each of the headed bolts 31 extends through one of the ball bushings 51, with the ball bearings 56 of the ball bushings 51 engaging the surface of the bolt 31. An annular washer 58 is mounted on the end of bolt 31 and retained in engagement with a radial shoulder 59 thereon by a lock washer 60 and nut 61 threadably engaging the end of bolt 31. Washer 58 has a diameter greater than the internal diameter of the bushing 51 to prevent the bolt 31 from being withdrawn through bushing 51. However, the length of the bolt 31 between the head 32 and the shoulder 59 is somewhat greater than the normal distance between the radial face 33 of flange 29 and the retaining ring 55 of the bushing 51 so that the sleeves 20 and 40 are free to move relative to one another axially along the bolt 31 within the limits defined by the length of the bolt 31. The ball bearing support between the bolt 31 and the sleeve 40 offers relative little frictional resistance to this axial movement so that shafts 13 and 14 may move freely toward or away from one another within limits defined by the length of bolts 31.

The resilient mounting ring 52 normally maintains the sleeves 20 and 40 in axial alignment, but, being resilient, the mounting ring may be deflected within very small limits to permit slight axial misalignment of the two sleeves. Also, the resiliency of ring 52 makes the coupling effective in absorbing shock or impact loads as well as vibration loads, so that the effect of such loads on one shaft is greatly reduced or completely isolated by the coupling from the other shaft.

While the sleeves 20 and 40 are maintained in substantial alignment with one another, they may be misaligned with respect to the shafts 13 and 14 in the conventional manner of flexible gear tooth couplings, as a result of the spherical gear teeth on the respective hub members. Thus, it is seen that the flexible gear type shaft coupling of the instant invention not only permits misalignment of the shafts, but also permits substantially free end float of the shafts. Further, the coupling is sufficiently torsionally resilient to effectively absorb impact and vibration loads which may be applied to one the shafts during operation.

While I have disclosed a preferred embodiment of my invention I wish it understood that I do not intend to be restricted solely thereto, but that I do intend to include all embodiments thereof which would be apparent to one skilled in the art and which come within the spirit and scope of my invention.

I claim:

1. In a gear type flexible shaft coupling including a hub rotatably fixed on the adjacent ends of each of a pair of substantially axially aligned shafts, a row of crowned gear teeth formed on the outer periphery of each of said hubs, and a sleeve assembly having internal gear teeth mounted on said hub members with said internal gear teeth meshing with said crowned gear teeth on each of said hubs, said sleeve assembly comprising a pair of annular sleeve members each having internal gear teeth formed on their inner periphery and mounted in axially spaced relation to one another, one on each of said hub members for rotation therewith, and connecting means extending between and rotatably connecting said sleeve members, said connecting means including antifriction bearing means permitting free axial movement of said sleeve members with respect to one another to permit free end float of said hub members.

2. The gear type flexible coupling defined in claim 1, further including means limiting the extent of relative axial movement of said sleeve members with respect to one another.

3. The gear type flexible coupling defined in claim 1, further comprising seal means on each of said sleeve members forming a lubrication seal between said sleeve members and said hubs.

4. The gear type flexible coupling defined in claim 1, wherein said means connecting said sleeve members includes resilient means permitting limited resiliently resisted rotational movement between said sleeve members.

5. The gear type flexible shaft coupling defined in claim 1, wherein said means rotatably connecting said sleeve members comprises a plurality of axially extending openings formed in each of said sleeve members at spaced intervals therearound, the openings in the respective sleeve members being axially and radially aligned in opposing pairs, a ball bushing mounted in one of the openings of each said pair of openings, and a shaft member mounted in the other opening of each said pair of openings, said shaft members extending through and engaging the bearing elements of said ball bushings to rotatably connect said sleeve members, said ball bushings and said shaft members being freely axially movable with respect to one another to permit free end float of said hub members.

6. The gear type flexible coupling defined in claim 5 further including means on each end of said shaft members for limiting the extent of relative axial movement of said sleeve members with respect to one another.

7. The gear type flexible coupling defined in claim 5, wherein said means connecting said sleeve members includes resilient means permitting limited resiliently resisted rotational movement between said sleeve members.

8. The gear type flexible coupling defined in claim 7, wherein said resilient means comprises an annular ring of resilient material extending around the outer periphery of said ball bushings and engaging the inner surface of said ones of said axial openings to frictionally retain said bushings from axial movement therein.

9. The gear type flexible coupling defined in claim 3 further comprising removable means closing the opposed ends of said annular sleeve members to form a closed lubrication chamber therein when said sleeve members are mounted on said hub members.

10. The gear type flexible coupling defined in claim 1 wherein said coupling means further comprises means permitting limited resiliently resisted rotational movement of said sleeve members relative to one another.

References Cited

UNITED STATES PATENTS

| | | | |
|---|---|---|---|
| 1,717,816 | 6/1929 | Sykes | 64—9 |
| 2,296,955 | 9/1942 | Sherwell et al. | 64—23 |
| 2,592,309 | 4/1952 | Meier | 64—9 |
| 2,628,135 | 2/1953 | Magee | 308—6 |
| 3,132,494 | 5/1964 | Hoffer | 64—9 |

FOREIGN PATENTS 719,734  12/1954  Great Britain.

HALL C. COE, *Primary Examiner.*

U.S. Cl. X.R.

64—10; 308—6